United States Patent
Fossum et al.

(10) Patent No.: US 12,404,392 B2
(45) Date of Patent: Sep. 2, 2025

(54) MOISTURE CUREABLE POLYMER FOR FLEXIBLE CABLES

(71) Applicant: Borealis AG, Vienna (AT)

(72) Inventors: Kjell Fossum, Stenungsund (SE); Stefan Hellstrom, Stenungsund (SE); Bernt-Ake Sultan, Stenungsund (SE)

(73) Assignee: BOREALIS AG, Vienna (AT)

( * ) Notice: Subject to any disclaimer, the term of this patent is extended or adjusted under 35 U.S.C. 154(b) by 706 days.

(21) Appl. No.: 17/599,053

(22) PCT Filed: Apr. 29, 2020

(86) PCT No.: PCT/EP2020/061944
§ 371 (c)(1),
(2) Date: Sep. 28, 2021

(87) PCT Pub. No.: WO2020/221822
PCT Pub. Date: Nov. 5, 2020

(65) Prior Publication Data
US 2022/0177680 A1    Jun. 9, 2022

(30) Foreign Application Priority Data
Apr. 30, 2019 (EP) .................................. 19171915

(51) Int. Cl.
| | | |
|---|---|---|
| *H01B 3/44* | (2006.01) | |
| *C08F 210/02* | (2006.01) | |
| *C08F 220/18* | (2006.01) | |
| *C08F 230/08* | (2006.01) | |
| *C08L 23/0869* | (2025.01) | |
| *C08L 23/0892* | (2025.01) | |
| *C08L 23/26* | (2006.01) | |

(52) U.S. Cl.
CPC .......... *C08L 23/0892* (2013.01); *H01B 3/441* (2013.01); *C08F 220/1804* (2020.02); *C08F 230/085* (2020.02); *C08L 23/0869* (2013.01); *C08L 23/26* (2013.01); *C08L 2203/202* (2013.01); *C08L 2666/44* (2013.01); *C08L 2666/84* (2013.01); *H01B 3/447* (2013.01); *H01B 3/448* (2013.01)

(58) Field of Classification Search
None
See application file for complete search history.

(56) References Cited

U.S. PATENT DOCUMENTS

| | | | | |
|---|---|---|---|---|
| 6,667,098 B1 * | 12/2003 | Eklind | ...................... | H01B 3/46 |
| | | | | 428/447 |
| 2008/0093103 A1 * | 4/2008 | Jungkvist | ............... | H01B 3/441 |
| | | | | 174/110 SR |
| 2014/0093730 A1 * | 4/2014 | Dahlen | .................. | H01B 3/441 |
| | | | | 524/266 |

FOREIGN PATENT DOCUMENTS

| | | | |
|---|---|---|---|
| CA | 2334925 | A1 | 6/1999 |
| EA | 010339 | B1 | 8/2008 |
| EP | 1528574 | A1 | 5/2005 |
| EP | 1916673 | A1 | 4/2008 |
| EP | 2215162 | B1 | 7/2016 |
| JP | H0757559 | A  * | 5/1995 |
| JP | 4968618 | B2 | 7/2012 |
| WO | WO 2000/036612 | A1 | 6/2000 |
| WO | WO 2000/068957 | A1 | 11/2000 |
| WO | 2005041215 | A1 | 5/2005 |
| WO | WO 2008/049636 | A1 | 5/2008 |
| WO | 2010130458 | A1 | 11/2010 |

OTHER PUBLICATIONS

"Joint, n.". Oxford English Dictionary, Oxford UP, Sep. 2024. Retrieved from www.oed.com on Dec. 17, 2024. (Year: 2024).*
"Cast resin cable joints: how to install RELICON i-Line SF". YouTube, uploaded by HellermannTyton, Dec. 13, 2016. https://www.youtube.com/watch?v=emGrquOqYMA (Year: 2016).*
International Search Report dated Jul. 27, 2020 in PCT/EP2020/061944.
Russian Search Report of Application No. PCT/EP2020/061944 Dated Jun. 9, 2022.

* cited by examiner

*Primary Examiner* — Richard A. Huhn
(74) *Attorney, Agent, or Firm* — Lippes Mathias LLP

(57) ABSTRACT

The invention relates to the use of a polyethylene composition comprising one or more ethylene copolymer(s) wherein the ethylene copolymer is a terpolymer containing monomer units with polar groups and monomer units with hydrolysable silane groups, wherein the monomer units with polar groups are present in an amount of more than 5 mol. % based on the total polyethylene composition, and a silanol condensation catalyst in an amount of 0.0001 to 5 wt. %, based on the total polyethylene composition for improving the adhesion between a layer of a cable comprising the polyethylene composition and a polyurethane resin.

13 Claims, No Drawings

MOISTURE CUREABLE POLYMER FOR FLEXIBLE CABLES

This is a 371 of PCT Application No. PCT/EP2020/061944, filed Apr. 29, 2020, which claims the benefit of European Application No. 19171915.2, filed Apr. 30, 2019, the contents of which are incorporated herein in their entirety.

The present invention relates to a cable comprising at least one layer, the at least one layer comprising a polyethylene composition, the polyethylene composition comprising one or more ethylene copolymer(s) containing monomer units with polar groups and monomer units with hydrolysable silane groups, and to the use of a polyethylene composition comprising one or more ethylene copolymer(s) containing monomer units with polar groups and monomer units with hydrolysable groups for improving the adhesion between a layer of a cable comprising the polyethylene composition and a polyurethane resin.

Electric power cables for low voltages, i.e. voltages of below 6 kV, usually comprise an electric conductor which is coated with an insulation layer. Such a cable will in the following be referred to as single wire cable. Optionally, two or more of such single wire cables are surrounded by a common outermost sheath layer, the jacket.

The insulation layer of low voltage power cables usually is made of a polymer composition comprising a polymer base resin, such as a polyolefin. A material commonly used as a base resin is polyethylene. Furthermore, in the final cable the polymer base resin usually is crosslinked.

For this and other applications such as for welding cables or electric vehicle charging cables today primarily peroxide crosslinked EPR (ethylene-propylene rubber) is used. However, the manufacturing process of these cables is very complicated as one needs to crosslink first the insulation in a vulcanisation tube and then apply the jacket and once again let it go through the vulcanisation tube for crosslinking the jacket. Accordingly, most commonly both the insulation and the jacket is crosslinked for these kind of flexible cables. For standard non-flexible cables, only the insulation is crosslinked.

In a further aspect, cable joints between low voltage power cables preferably are formed in such a way that, after stripping off part of the insulation layer at the end of both cables to be joined and connecting the electric conductors, a new insulation layer covering the joint conductors is often formed of a polyurethane polymer. Accordingly, it is important that the polymer composition of the original insulation layer shows a good adhesion to the polyurethane polymer used for restoring the insulation layer so that the layer is not disrupted even under mechanical stress at the cable joints.

In still a further aspect certain applications necessitate flexibility of the cables. Hence, materials for flexible cables as described in EN 50525 standards typical shall have a flexural modulus of below 30 MPa.

EP 1 528 574 relates to a low voltage power cable comprising an insulation layer with a density below 1100 kg/m$^3$ which comprises a polyolefin comprising 0.02 to 4 mol. % of a compound having polar groups.

Accordingly, it is the object of the present invention to provide a polyethylene composition which can be used for improving the adhesion between a layer of a cable comprising the polyethylene composition and a polyurethane resin.

It is still a further object of the invention to provide a polyethylene composition as a layer in a cable which cures or crosslinks at ambient conditions and does not need further crosslinking, such as in e.g. vulcanization tubes.

The present invention is based on the surprising finding that such an improved adhesion between a layer of a cable comprising the polyethylene composition and a polyurethane resin cable can be achieved by using an ethylene copolymer with monomer units with polar groups present in an amount of more than 5 mol. %.

The present invention therefore provides the use of a polyethylene composition comprising
a) one or more ethylene copolymer(s) wherein the ethylene copolymer is a terpolymer containing monomer units with polar groups and monomer units with hydrolysable silane groups, wherein the monomer units with polar groups are present in an amount of more than 5 mol. % based on the total polyethylene composition, and
b) a silanol condensation catalyst in an amount of 0.0001 to 5 wt. %, based on the total polyethylene composition
for improving the adhesion between a layer of a cable comprising the polyethylene composition and a polyurethane resin.

It has surprisingly been found that a polyethylene composition comprising one or more ethylene copolymer(s) containing monomer units with polar groups and monomer units with hydrolysable silane-groups, wherein the monomer units with polar groups are present in an amount of more than 5 mol. % based on the total polyethylene composition, can be used for improving the adhesion towards polyurethane cast resins, so that durable joints between cables can be made with polyurethane cast resins.

At the same time, the layer of the cable fulfills the demanding requirements for the mechanical properties of a cable, in particular a low voltage (LV) power cable. In particular, the elongation at break and at the same time the flexural modulus is improved. LV cables are often installed in buildings. Single wire cables usually are installed in a conduit and during installation the single wire cables are drawn through long conduits. Sharp corners and especially other installations could cause damages to the insulation layer of the cable. The low voltage power cable according to the invention due to its improved elongation at break effectively prevents such breaks during installation and has at the same time a high flexibility.

Furthermore, the layer can be quickly crosslinked at ambient conditions. In fact, the crosslinking speed of the inventive ethylene copolymers is increasing with increasing acrylate content and accordingly the crosslinking speed is very rapid for these high acrylate-containing ethylene copolymers.

A further advantage of the present invention is that scorch problems can be reduced or even eliminated by addition of a scorch retarding agent to the polyethylene compositions of the invention.

The polyethylene composition comprises one or more ethylene copolymer(s) a). Preferably, the polyethylene composition comprises, or consists of, two ethylene copolymers a) which differ from each other, more preferably the polyethylene composition comprises, or consists of, one ethylene copolymer a).

The one or more ethylene copolymer(s) a) containing monomer units with polar groups may for example be produced by grafting of a polyolefin with a polar-group containing compound, i.e. by chemical modification of the ethylene polymer by addition of a polar group containing compound mostly in a radical reaction. Grafting is e.g. described in U.S. Pat. Nos. 3,646,155 and 4,117,195.

It is, however, preferred that the one or more ethylene copolymer(s) a) is produced by copolymerization of ethylene in the presence of monomer units with polar groups and monomer units with hydrolysable silane groups.

In the case of copolymerization, the complete monomer unit with polar groups is designated by the expression "monomer units with polar groups". Thus, the weight fraction of the monomer unit with polar groups in the ethylene copolymer which has been obtained by copolymerization may simply be calculated by using the weight ratio of the monomers units with polar groups that have been polymerized into the ethylene copolymer. For example, where a ethylene copolymer comprising polar groups is produced by copolymerization of ethylene monomers with a vinyl compound comprising a polar group, also the vinyl part, which after polymerization forms part of the polymer backbone, contributes to the weight fraction of the "monomer unit with polar groups".

Preferably, the monomer units with polar groups are selected from siloxane, amide, anhydride, carboxylic, carbonyl, hydroxyl, ester and/or epoxy group.

As examples of monomer units with polar groups may be mentioned the following: (a) vinyl carboxylate esters, such as vinyl acetate and vinyl pivalate, (b) (meth)acrylates, such as methyl(meth)acrylate, ethyl(meth)acrylate, butyl(meth)acrylate and hydroxyethyl(meth)acrylate, (c) olefinically unsaturated carboxylic acids, such as (meth)acrylic acid, maleic acid and fumaric acid, (d) (meth)acrylic acid derivatives, such as (meth)acrylonitrile and (meth)acrylic amide, and (e) vinyl ethers, such as vinyl methyl ether and vinyl phenyl ether.

Amongst these monomers, vinyl esters of monocarboxylic acids having 1 to 4 carbon atoms, such as vinyl acetate, and (meth)acrylates of alcohols having 1 to 4 carbon atoms, such as methyl (meth)acrylate, are preferred.

Especially preferred monomers are butyl acrylate, ethyl acrylate, methyl methacrylate and/or methyl acrylate. Two or more such olefinically unsaturated compounds may be used in combination. The term "(meth)acrylic acid" is intended to embrace both acrylic acid and methacrylic acid.

Preferably, the monomer units with polar groups are butyl acrylate, ethyl acrylate, methyl acrylate and/or methyl methacrylate, more preferably butyl acrylate and/or methyl acrylate, more preferably methyl acrylate.

Preferably, the monomer units with polar groups are present in an amount of more than 6 mol. %, more preferably more than 7 mol. %, and most preferably more than 8 mol. % based on the total polyethylene composition.

Preferably, the monomer units with polar groups are present in an amount of not more than 25 mol. %, more preferably of not more than 20 mol. %, more preferably of not more than 17.5 mol. %, more preferably of not more than 15 mol. %, more preferably of not more than 13.5 mol. %, more preferably of not more than 11 mol. %, and most preferably of not more than 9.5 mol. %, based on the total polyethylene composition.

Apart from monomer units with polar groups, the one or more ethylene copolymer(s) a) also contains monomer units with hydrolysable silane-groups. These silane-groups may be introduced into the polymer either via grafting, as e.g. described in U.S. Pat. Nos. 3,646,155 and 4,117,195, or preferably via copolymerization of ethylene in the presence of monomer units with polar groups and monomer units with hydrolysable silane groups.

In cases where a copolymerization is used, the complete monomer with silane groups is designated by the expression "monomer unit with hydrolysable silane-groups".

Preferably, the ethylene copolymer a) has been obtained by copolymerization. In the case of polyethylene, the copolymerization is preferably carried out with monomer unit with hydrolysable silane-groups represented by the formula $$R^1SiR^2_qY_{3-q} \quad (I)$$

wherein
$R^1$ is an ethylenically unsaturated hydrocarbyl, hydrocarbyloxy or (meth)acryloxy hydrocarbyl group,
$R^2$ is an aliphatic saturated hydrocarbyl group, Y which may be the same or different, is a hydrolysable organic group and q is 0, 1 or 2.

Special examples of the monomer unit with hydrolysable silane-groups are those wherein $R^1$ is vinyl, allyl, isopropenyl, butenyl, cyclohexanyl or gamma-(meth)acryloxy propyl; Y is methoxy, ethoxy, formyloxy, acetoxy, propionyloxy or an alkyl- or arylamino group; and $R^2$, if present, is a methyl, ethyl, propyl, decyl or phenyl group.

A preferred monomer unit with hydrolysable silane groups is represented by the formula $$CH_2=CHSi(OA)_3 \quad (II)$$

wherein A is a hydrocarbyl group having 1-8 carbon atoms, preferably 1-4 carbon atoms.

The most preferred monomer units with hydrolysable silane groups are vinyl trimethoxysilane, vinyl bismethoxyethoxysilane, vinyl triethoxysilane, gamma-(meth)acryloxypropyltrim ethoxysilane, gamma(meth)acryloxypropyltriethoxysilane, and vinyl triacetoxysilane.

The copolymerization of the ethylene in the presence of monomer units with polar groups and the monomer units with hydrolysable silane groups may be carried out under any suitable conditions resulting in the copolymerization of the ethylene and the two monomer units. The resulting ethylene copolymer(s) a) can thus also be labelled as terpolymer(s).

Preferably, the monomer units with hydrolysable silane groups comprise, or consist of, vinyl trimethoxy silane, vinyl bismethoxyethoxy silane, vinyl triethoxy silane, gamma-(meth)acryl-oxypropyltrimethoxy silane, gamma (meth)acryloxypropyltriethoxy silane, vinyl triacetoxy silane and mixtures thereof, more preferably vinyl trimethoxy silane.

Preferably, the monomer units with hydrolysable groups are present in an amount of 0.001 wt. % to 15 wt. %, more preferably 0.01 wt. % to 5 wt. %, more preferably 0.1 wt. % to 2.5 wt. %, more preferably 0.1 wt. % to 2 wt. %, and most preferably 1 wt. % to 2 wt. % based on the total polyethylene composition The polyethylene composition used for the layer of the cable comprises a silanol condensation catalyst b) in an amount of 0.0001 to 5 wt. % based on the total polyethylene composition. The silanol condensation catalyst b) is present in an amount of preferably 0.0005 to 4 wt. %, more preferably 0.001 to 3 wt. %, more preferably 0.005 to 2 wt. %, and most preferably 0.05 to 1 wt. % based on the total polyethylene composition.

Preferably, the silanol condensation catalyst b) comprises Lewis acids, inorganic acids such as sulphuric acid and hydrochloric acid, and organic acids such as citric acid, stearic acid, acetric acid, sulphonic acid and alkanoic acids as dodecanoic acid.

Preferably, the silanol condensation catalyst b) comprises, or consists of, a sulphonic acid based catalyst or a tin based catalyst.

Preferably, the silanol condensation catalyst b) is a sulphonic acid based catalyst according to formula (III)

$$ArSO_3H \quad (III)$$

or a precursor thereof, Ar being a hydrocarbyl substituted aryl group and the total compound containing 14 to 28 carbon atoms.

Preferably, the Ar group is a hydrocarbyl substituted benzene or naphthalene ring, the hydrocarbyl radical or radicals containing 8 to 20 carbon atoms in the benzene case and 4 to 18 atoms in the naphthalene case.

It is further preferred that the hydrocarbyl radical is an alkyl substituent having 10 to 18 carbon atoms and still more preferred that the alkyl substituent contains 12 carbon atoms and is selected from dodecyl and tetrapropyl. Due to commercial availability it is most preferred that the aryl group is a benzene substituted group with an alkyl substituent containing 12 carbon atoms.

Preferably, the sulphonic acid based catalyst comprises dodecyl benzene sulphonic acid, tetrapropyl benzene sulphonic acid, alkylated naphthalene sulphonic acid, arylalkyl sulphonic acid, alkylated aryl disulphonic acid or mixtures thereof, preferably consists of dodecyl benzene sulphonic acid or tetrapropyl benzene sulphonic acid.

The silanol condensation catalyst b) may also be precursor of a compound of formula (III), i.e. a compound that is converted by hydrolysis to a compound of formula (III). Such a precursor is for example the acid anhydride of the sulphonic acid compound of formula (III). Another example is a sulphonic acid of formula (III) that has been provided with a hydrolysable protective group as e.g. an acetyl group which can be removed by hydrolysis to give the sulphonic acid of formula (III).

Preferably, the tin based catalyst is one or more selected from the group of dibutyl tin dilaureate (DBTDL), dioctyl tin dilaureate (DOTDL), dibutyl tin diacetate, stannous acetate, stannous caprylate. More preferably, the condensation catalyst (B) is dibutyl tin dilaureate, dioctyl tin dilaureate or a mixture thereof, most preferably the condensation catalyst (B) is dioctyl tin dilaureate (DOTDL).

The silanol condensation catalyst b) is preferably added as a crosslinking catalyst masterbatch (CM) to the ethylene copolymer(s) a). The masterbatch preferably comprises the silanol condensation catalyst b) and a polymeric carrier, and optionally other additives such as an antioxidant. The polymeric carrier is preferably an ethylene copolymer, more preferably a copolymer of ethylene and a monomer containing alkyl acrylate groups, and most preferably an ethylene butylacrylate copolymer.

Preferably, the polyethylene composition further comprises c) a scorch retardant additive.

Preferably, the scorch retardant additive c) is present in an amount of 0.0003 mole/1000 g polyethylene composition to 0.6 mole/1000 g polyethylene composition, more preferably 0.003 mole/1000 g polyethylene composition to 0.3 mole/1000 g polyethylene composition, more preferably 0.03 mole/1000 g polyethylene composition to 0.24 mole/1000 g polyethylene composition, more preferably 0.045 mole/1000 g polyethylene composition to 0.18 mole/1000 g pol polyethylene composition, and most preferably 0.06 mole/1000 g polyethylene composition to 0.12 mole/1000 g polyethylene composition.

The scorch retardant additive c) can be added into the polyethylene composition to reduce or even eliminate scorch, and at the same time without any negative effect on the full crosslinking performance.

Preferably, the scorch retardant additive c) comprises an alkoxy silane. Preferably, the alkoxy silane comprises hexadecyl trimethoxy silane, octyl triethoxy silane or mixtures thereof, more preferably the alkoxy silane comprises hexadecyl trimethoxy silane, most preferably the alkoxy silane consists of hexadecyl trimethoxy silane.

Preferably, the polyethylene composition has an $MFR_2$ (2.16 kg) of 0.1 to 50 g/10 min, more preferably of 0.5 to 25 g/10 min, and most preferably of 1.5 to 15 g/10 min measured according to ISO 1133.

The polyethylene composition according to the invention can be crosslinked. Preferably, the polyethylene composition according to the invention is crosslinked. The crosslinking of the polyethylene composition of the invention is preferably carried out by so-called moisture curing as is known in the art. Reference is made to e.g. WO 95/17463 and WO 00/36612. In a first step, the silane groups of the ethylene copolymer(s) are hydrolysed under the influence of water or steam, resulting in the splitting-off of alcohol and the formation of silanol groups. In a second step, the silanol groups are crosslinked by a condensation reaction splitting off water. In both steps, the silanol condensation catalyst b) as described herein is used as catalyst.

Crosslinking can be carried out at ambient conditions, preferably at 45% to 65% relative humidity and a temperature of 20° C. to 25° C., most preferably at 55% relative humidity and a temperature of 23° C. Crosslinking can also be carried out at elevated temperature, preferably at 70° C. to 90° C. in water.

Preferably, the layer is an insulation layer or a sheath layer.

Preferably, the cable further comprises a skin layer. The skin layer is the outermost layer of the cable. The skin layer is preferably adjacent to the insulation layer or the sheath layer. The skin layer has a thickness of preferably 0.01 to 0.2 mm.

The skin layer is different from the layer comprising the polyethylene composition of the invention as described above. The skin layer preferably comprises, or consists of, a thermoplastic polyolefin or a crosslinked polyolefin. The polyolefin can be an ethylene copolymer containing monomer units with hydrolysable silane groups, a high density polyethylene, a linear low density polyethylene, a medium density polyethylene or a polypropylene.

The high density polyethylene preferably has a density of 940 to 970 kg/m³, the medium density polyethylene preferably has a density of 925 to below 940 kg/m³. The ethylene copolymer containing monomer units with hydrolysable silane groups used for the skin layer preferably does not comprise monomer units with polar groups.

Applying such a skin layer to the cable according to the invention has the advantage of improved abrasion resistance and mechanical strength of the cable.

The cable preferably further comprises an inner insulation layer. Inner insulation layer means that this layer is the innermost layer of the cable. In other words, the inner insulation layer is in direct contact with the electric conductor of the cable. Preferably, the inner insulation layer is between the electric conductor of the cable and the layer comprising the polyethylene composition of the invention.

The inner insulation layer is different from the layer of the cable as described above. The inner insulation layer preferably comprises, or consists of, a thermoplastic polyolefin or a crosslinked polyolefin. The polyolefin can be an ethylene copolymer containing monomer units with hydrolysable silane groups, a high density polyethylene, a linear low density polyethylene, a medium density polyethylene or a polypropylene, as described above. Such an inner insulation layer improved the electrical performance of the cable, in particular for medium voltage (MV) cables. Preferably, the cable is a low voltage cable or a medium voltage cable. Low voltage means a voltage of less than 6 kV, and medium voltage means a voltage of 6 kV to 68 kV.

EXAMPLES

1. Determination Methods a) Melt Flow Rate (MFR)

The melt flow rate (MFR) is determined according to ISO 1133 and is indicated in g/10 min. The MFR is an indication of the flowability, and hence the processability, of the polymer. The higher the melt flow rate, the lower the viscosity of the polymer.

The $MFR_2$ of polyethylene (co-)polymers is measured at a temperature 190° C. and at a load of 2.16 kg.

b) Density

Density of the polymer was measured according to ISO 1183-1:2004 Method A on compression moulded specimen prepared according to EN ISO 1872-2 and is given in kg/m³ c) FTIR

The amount of monomer units with polar groups and monomer units with hydrolysable silane-groups can be determined using Fourier Transform Infrared Spectroscopy (FTIR).

In particular, the amount of butyl acrylate (BA) in the polymers was measured by Fourier Transform Infrared Spectroscopy (FTIR). The wt. %/mole. % of butyl acrylate was determined from the peak for butyl acrylate at 3450 $cm^{-1}$, which was compared to the peak of polyethylene at 2020 $cm^{-1}$.

The amount of vinyl trimethoxy silane in the polymers was measured by Fourier Transform Infrared Spektroscopy (FTIR). The wt. % of vinyl trimethoxy silane was determined from the peak for silane at 945 $cm^{-1}$, which was compared to the peak of polyethylene at 2665 $cm^{-1}$.

d) Adhesion Strength

The adhesion strength is measured according to standard HD 603 S1/A3:2008, see part 5, section G. This standard prescribes a minimum adhesion strength of 1 N/mm width of cable sample between the cable insulation and the joint cast resin (commonly Polyurethane but also epoxy based is existing).

The data in this invention is based on adhesion to tape samples with a thickness of 0.5 mm and a length of 30 cm. The tapes are prepared on a Collin TeachLine E20T tape extruder with a 4.2:1, 20D Compression screw, D=20 mm, with a temperature profile of 135/165/755° C. at 30 rpm. The tape samples are then conditioned for at least 24 hours in 23° C. and 59% relative humidity and then cleaned with iso-propyl alcohol.

The conditioned tapes are placed on plaques made of HDPE. The plaques contain openings with a width of 10 mm, length of 150 mm and depth of 15 mm. The tape samples are placed above the openings. The tapes are fixed above the openings by another HDPE plaque. The polyurethane resin (PUR) is mixed with the hardener and poured in the openings. The mould is then conditioned for 24 hours. The PUR crosslink and hardened during that time. The tape and the PUR sample is removed from the holder and the adhesion force measured in a tensile tester with a special sample holder as described in VDE 0472-633.

The crosslinking catalyst masterbatch was dry-blended with the polymers/compounds outlined in table 2. Thereafter 1.8 mm thick tape was extruded with a temperature profile of 135/145/155° C. with 30 rpm on a Collin TeachLine E20T tape extruder with a 4.2:1, 20D Compression screw, D=20 mm.

e) Crosslinking Speed 5 wt. % of a crosslinking catalyst is added to the formulations given below, and Hot Set elongation in % is evaluated on 1 mm tapes after storage at 23° C. at 55% relative humidity for 4, 7 and 14 days.

f) Mechanical Hardness Shore a and Shore D

The mechanical hardness Shore A and Shore D are measured according to ISO 868 on 80×10×4 type B specimens. The specimens are moulded according to EN ISO 1872-2 for ethylene based polymers. For Shore D a 30° cone for indentation is used. For both Shore A and D measurements the value 1 sec after indentation is taken.

g) Flexural Modulus

Flexural Modulus Flexural modulus was determined according to ISO 178. The test specimens were extruded tapes with a thickness of 2 mm. The length of the span between the supports was 64 mm, the test speed was 2 mm/min and the load cell was 100 N. The equipment used was an Alwetron TCT 25. The specimen were conditioned for minimum 16 hours at 23+/−2° C. and 50% relative humidity prior testing.

h) Hot Set Elongation (%)

To determine that the crosslinkable polyethylene composition are properly cured the hot set elongation and permanent set are determined according to IEC 60811-507, by measuring thermal deformation at 200° C. and at a load of 20 $N/cm^2$ is used. Three dumb-bell test samples are prepared from a tape consisting of a polyethylene composition to be tested by cutting test samples from the tape. Each test sample is fixed vertically from upper end thereof in the oven and the load of 20 $N/cm^2$ are attached to the lower end of each test sample. After 15 min, 200° C. in oven the distance between the premarked lines is measured and the percentage hot set elongation is calculated and expressed as Hot Set elongation in %.

For permanent set %, the tensile force (weight) is removed from the test samples and after recovered in 200° C. for 5 minutes and then let to cool in room temperature to ambient temperature. The permanent set % is calculated from the distance between the marked lines.

i) Tensile Strength at Break and Tensile Strain at Break (Elongation at Break)

The tensile strength at break and tensile strain at break were measured in accordance with ISO 527-1: 2012 at 23° C. and 50% relative humidity on an Alwetron TCT 10 tensile tester at a speed of 250 mm/min. The extensometer used was MFE-900. The test specimens were extruded tapes with a thickness of 2 mm. The specimens were conditioned for minimum 16 hours at 23+/−2° C. and 50% relative humidity prior testing. The average value out of 6 to 10 samples is reported herein.

j) Tape Appearance

The tape appearance is evaluated with the bare eye. Extruded tapes are prepared as described above. The occurrence of many gels on the tape is graded as (−−), occurrence of some gels as (−), a good appearance as (+) and excellent appearance as (++).

2. Experimental Methods

Formulations containing the crosslinking catalyst masterbatch were crosslinked in 90° C. water for 24 h prior conditioning for the adhesion tests. The crosslinking catalyst masterbatch (CM) was dry-blended into the specific formulation of choice prior to the tape extrusion step.

3. Materials a) Ethylene Copolymers

The ethylene copolymers with the type and amount of comonomer indicated used in the present invention are given in Table 1 below. In table 1 below, Polymers B and C are terpolymers.

Polymers A, B and C were produced in a 660 m long split feed high pressure tubular reactor (Union Carbide type A-1). The inner wall diameter is 32 mm. Chain transfer agent (propylene), initiators (t-butylperoxy 2-ethylhexanoate (Luperox 26) and air) and co-monomers were added to the reactor in a conventional manner. Polymerization pressure were 230 MPa for both polymers. The maximum polymerization temperature was 310° C. for polymer A, 285° C. for Polymer B and C.

TABLE 1

Ethylene copolymers

| Material | Polymer A | Polymer B | Polymer C |
|---|---|---|---|
| $MFR_2$, g/10 min | 1 | 0.5 | 3.5 |
| Density, $kg/m^3$ | 923 | 930 | 945 |
| VTMS content, wt. % | 1.1 | 1.05 | 1.4 |
| Polar group | — | BA | MA |
| Polar group content, wt. %/mol. % | 0 | 9.5/2.3 | 22.5/8.7 |

BA: butyl acrylate
MA: methyl acrylate
VTMS: vinyl trimethoxy silane

The scorch retarding agent (SRA) was hexadecyl trimethoxy silane (HDTMS) and was added in the amounts as indicated to Polymers A to C by preheating the pellets to 60° C. for 12 hours. Thereafter the pellets were forwarded to a drum blender in which the pellets were impregnated with the given amount of HDTMS and mixing performed for 20 minutes. The impregnated pellets were then kept at 60° C. for further 24 hours. Thereby, seven formulations were obtained as shown in table 2 below.

TABLE 2

Formulations

| | Formulation | | | | | | |
|---|---|---|---|---|---|---|---|
| | 1 | 2 | 3 | 4 | 5 | 6 | 7 |
| Material | Polymer A | Polymer A | Polymer B | Polymer C | Polymer C | Polymer C | Polymer C |
| SRA, wt. % | 0.35 | 0.35 | 1 | 0 | 1 | 2 | 3 | b) Crosslinking Catalyst Masterbatch CM-A

CM-A consists of 1.7 wt. % dodecylbenzene sulphonic acid and a stabilizer, 2 wt. % Irganox 1010, and 3 wt. % of HDTMS which are compounded into an ethylene butylacrylate (BA) copolymer with a BA content of 17 wt. % and $MFR_2$=8 g/10 min.

c) Crosslinking Catalyst Masterbatch CM-B

CM-B consists of 3.6 wt. % dioctyl tin dilaureate (DOTDL) and a stabilizer, 2 wt. % Irganox 1010 and 1 wt. % HDTMS which are compounded into an ethylene butylacrylate (BA) copolymer with a BA content of 17 wt. % and $MFR_2$=8 g/10 min.

d) Polyurethane Resin (PUR)

The polyurethane resin (PUR) used in the present invention as cable jointing cast resin is Protolin 2000, commercially available from Lovink-Enertech. It is a two component non-filled and non-colored two-component cast resin.

4. Results

The comparative (CE) and inventive examples (IE) were prepared by dry-blending the crosslinking silanol condensation catalyst masterbatch as indicated to Formulations 1 to 7 before extrusion. The amounts and type of catalysts added are given in table 3 below.

TABLE 3

Compositions of comparative and inventive examples

|  | CE1 | CE2 | CE3 | IE1 | IE2 | IE3 | IE4 |
|---|---|---|---|---|---|---|---|
| Formulation | 1 | 2 | 3 | 4 | 5 | 6 | 7 |
| catalyst, wt. % | CM-A, 5 | CM-B, 5 | CM-A, 5 | CM-A, 5 | CM-A, 5 | CM-A, 5 | CM-A, 5 |

Formulations 1 to 7 were crosslinked at ambient conditions (23° C., 55% relative humidity) for 10 days. The results after crosslinking the examples are shown in table 4 below.

TABLE 4

Properties of examples after crosslinking

|  | CE1 | CE2 | CE3 | IE1 | IE2 | IE3 | IE4 |
|---|---|---|---|---|---|---|---|
| SRA, wt. % | 0.35 | 0.35 | 1 | 0 | 1 | 2 | 3 |
| Scorch Test: tape appearance | ++ | ++ | ++ | -- | - | + | ++ |
| Shore D | 52 | 52 | 46 |  |  | 25 |  |
| Shore A |  |  | 82 |  |  | 93 |  |
| Flexural Modulus, MPa | 170 | 236 | 100 | 22 | 26 | 24 | 25 |
| Tensile strength at break, MPa | 21 | 16 | 19 | 14 | 15 | 15 | 19 |
| Tensile strain at break, % | 439 | 526 | 224 | 344 | 375 | 390 | 565 |
| Hot Set elongation, % | 82 | 448 | 32 | 29 | 23 | 25 | 26 |

Tape appearance: Excellent (++), Good (+), gels (−), many gels (−−)

The mechanical properties and hot-set data of the inventive examples such as the tensile strength and elongation at break are far over the requirement for flexible cables as expressed in e.g. EN 506363-1 (insulations) and EN50363-2-1 (jacketing) with respect to tensile strength. The requirement is between 5-7 MPa for the different EPR or EVA type of insulations. The flexural modulus is significantly improved for the inventive examples versus the comparative examples. The inventive examples also show a high tensile strain at break (elongation at break) of more than 200% and a tensile strength of more than 6 MPa.

The inventive examples meet, at the same time, the EN 50525 standards for a typical flexural modulus of below 30 MPa.

Furthermore, all inventive examples IE1 to IE4 show a high crosslinking degree as evidenced by the Hot Set elongation after 15 min, see table 4. The amount of SRA has only minor effects on the Hot Set results of the inventive examples. Increasing the amount of SRA (1E2 to IE4) lowers the Hot Set value versus the inventive example without SRA (IE1).

Table 5 shows the results of the crosslinking speed of comparative examples CE1 and CE3 in comparison to IE4 after adding 5 wt. % of crosslinking catalyst CM-A.

TABLE 5

Crosslinking speed

| Days at ambient conditions (23° C., 55% relative humidity) | | | |
|---|---|---|---|
|  | 4 | 7 | 14 |
| CE1, % | 140 | 94 | 67 |
| CE3, % | 37 | 31 | 30 |
| IE4, % | 27 | 26 | 25 |

The inventive terpolymer IE4 shows an outstanding crosslinking speed and is fully crosslinked after 4 days. Also the final Hot Set level is decreased with increasing acrylate concentration, as can be seen from the comparison of examples CE3 with IE4.

Table 6 shows the results of the adhesion to PUR cast resin Protolin 2000 comparative examples CE1 and CE3 in comparison to IE4 after adding 5 wt. % of crosslinking catalyst CM-A.

TABLE 6

Adhesion towards PUR joint cast resin

|  | Adhesion, N/mm |
|---|---|
| CE1 | 0.1 |
| CE3 | 0.5 |
| IE4 | >10 |

According to standard HD 603 S1/A3:2008 an adhesion strength of at least 1 N/mm is required between the insulation of the cable and the PUR case resin. As can be seen from table 6, the adhesion of IE4 to PUR is significantly higher than this lower limit.

The invention claimed is:
1. A method, comprising:
adhering a layer of a cable comprising a polyethylene composition to a polyurethane cast resin at a cable joint;
wherein the polyethylene composition comprises:
a) one or more ethylene copolymer(s) wherein the ethylene copolymer is a terpolymer containing monomer units with polar groups and monomer units with hydrolysable silane groups, wherein the monomer units with polar groups are present in an amount of more than 5 mol. % based on the total polyethylene composition, and b) a silanol condensation catalyst in an amount of 0.0001 to 5 wt. %, based on the total polyethylene composition wherein the monomer units with polar groups are methyl acrylate and/or methyl methacrylate and wherein the polyurethane resin and the layer comprising the polyethylene composition adhere with an adhesion strength greater than 10 N/mm.

2. The method of claim 1, wherein the monomer units with polar groups are present in an amount of not more than 25 mol. % based on the total polyethylene composition.

3. The method of claim 1, wherein the monomer units with hydrolysable silane groups comprise vinyl trimethoxy silane, vinyl bismethoxyethoxy silane, vinyl gamma-(meth) acryl-oxypropyltrimethoxy silane, triethoxy silane, gamma (meth)acryloxypropyltriethoxy silane, vinyl triacetoxy silane and mixtures thereof.

4. The method of claim 1, wherein the monomer units with hydrolysable groups are present in an amount of 0.001 wt. % to 15 wt. % based on the total polyethylene composition.

5. The method of claim 1, wherein the silanol condensation catalyst b) comprises a sulphonic acid based catalyst or a tin based catalyst.

6. The method of claim 5, wherein the sulphonic acid based catalyst comprises dodecyl benzene sulphonic acid, tetrapropyl benzene sulphonic acid, alkylated naphthalene sulphonic acid, arylalkyl sulphonic acid, alkylated aryl disulphonic acid or mixtures thereof.

7. The method of claim 5, wherein the polyethylene composition further comprises c) a scorch retardant additive.

8. The method of claim 7, wherein the scorch retardant additive c) is present in an amount of 0.0003 mole/1000 g polyethylene composition to 0.6 mole/1000 g polyethylene composition.

9. The method of claim 7, wherein the scorch retardant additive c) comprises an alkoxy silane.

10. The method of claim 7, wherein the polyethylene composition has an MFR2 (2.16 kg, 190° C.) of 0.1 to 50 g/10 min measured according to ISO 1133.

11. The method of claim 7, wherein the layer is an insulation layer or a sheath layer.

12. The method of claim 7, wherein the cable further comprises a skin layer.

13. A method for connecting electrical conductors of two cables, each cable having an insulation layer, the method comprising
  1) Stripping off part of the insulation layer at the end of each cable;
  2) joining the stripped end of one cable with the stripped end of the other cable by adhering the insulation layer to a polyurethane resin;
  wherein the insulation layer comprises a polyethylene composition and wherein the polyethylene composition comprises:
  c) one or more ethylene copolymer(s) wherein the ethylene copolymer is a terpolymer containing monomer units with polar groups and monomer units with hydrolysable silane groups, wherein the monomer units with polar groups are present in an amount of more than 5 mol. % based on the total polyethylene composition, and
  d) a silanol condensation catalyst in an amount of 0.0001 to 5 wt. %, based on the total polyethylene composition wherein the monomer units with polar groups are methyl acrylate and/or methyl methacrylate, and wherein the polyurethane resin and the insulation layer adhere with an adhesion strength greater than 10 N/mm.

* * * * *